(12) United States Patent
Kitakaze

(10) Patent No.: US 11,707,797 B2
(45) Date of Patent: Jul. 25, 2023

(54) MACHINE TOOL

(71) Applicant: CITIZEN WATCH CO., LTD., Nishitokyo (JP)

(72) Inventor: Ayako Kitakaze, Tokorozawa (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 141 days.

(21) Appl. No.: 17/423,109

(22) PCT Filed: Jan. 16, 2020

(86) PCT No.: PCT/JP2020/001339
§ 371 (c)(1),
(2) Date: Jul. 15, 2021

(87) PCT Pub. No.: WO2020/149372
PCT Pub. Date: Jul. 23, 2020

(65) Prior Publication Data
US 2022/0126393 A1    Apr. 28, 2022

(30) Foreign Application Priority Data
Jan. 18, 2019   (JP) .................................. 2019-007308

(51) Int. Cl.
*B23K 20/00* (2006.01)
*B23K 20/12* (2006.01)
(Continued)

(52) U.S. Cl.
CPC .......... *B23K 20/121* (2013.01); *B23K 20/125* (2013.01); *B23Q 3/186* (2013.01); *B23Q 17/2283* (2013.01); *B23Q 2017/001* (2013.01)

(58) Field of Classification Search
CPC .. B23K 20/12; B23K 20/121; B23K 20/1205; B23K 20/123; B23K 20/125; B23K 20/126; B23K 20/129
See application file for complete search history.

(56) References Cited

U.S. PATENT DOCUMENTS 3,435,510 A * 4/1969 Oberle ................... B23K 20/12
228/113
3,717,295 A * 2/1973 Woodall ................. B23K 20/12
228/114.5
(Continued)

FOREIGN PATENT DOCUMENTS

CN   102990220 A    3/2013
JP   H06312278 A    11/1994
(Continued)

OTHER PUBLICATIONS

Jun. 16, 2021, International Preliminary Report on Patentability issued in the International Patent Application No. PCT/JP2020/001339.
(Continued)

*Primary Examiner* — Erin B Saad
(74) *Attorney, Agent, or Firm* — Kenja IP Law PC

(57) ABSTRACT

A machine tool includes a first spindle, a second spindle, and a joining means for joining the axial ends of workpieces gripped by the spindles to form a joined workpiece. The machine tool further includes an electric servomotor for moving the first spindle in the direction intersecting the axis of the first spindle, a current value detection means for detecting the current value of the electric servomotor, and a misalignment detecting means for detecting misalignment of a first workpiece and a second workpiece in the joined workpiece, based on the current value detected by the current value detection means when the joined workpiece gripped by the two spindles is rotated.

4 Claims, 7 Drawing Sheets

(51) Int. Cl.
  *B23Q 3/18* (2006.01)
  *B23Q 17/22* (2006.01)
  *B23Q 17/00* (2006.01)

(56) References Cited

U.S. PATENT DOCUMENTS

| | | | | |
|---|---|---|---|---|
| 4,998,663 | A * | 3/1991 | Cakmak | B23K 20/12 |
| | | | | 228/103 |
| 6,021,938 | A * | 2/2000 | Bock | B23K 20/12 |
| | | | | 228/103 |
| 7,651,019 | B2 * | 1/2010 | Kyriakoglou | B23K 20/12 |
| | | | | 228/2.1 |
| 8,777,089 | B2 * | 7/2014 | Beech | B29C 66/92 |
| | | | | 228/2.1 |
| 2006/0196916 | A1 * | 9/2006 | Goldstein | B23K 20/12 |
| | | | | 228/114.5 |
| 2007/0051776 | A1 * | 3/2007 | Estes | B23K 20/129 |
| | | | | 228/101 |
| 2007/0152022 | A1 * | 7/2007 | Strahm | B23K 20/1205 |
| | | | | 228/114 |
| 2007/0215671 | A1 | 9/2007 | Knott et al. | |
| 2014/0018178 | A1 * | 1/2014 | Yoshida | B23K 20/122 |
| | | | | 228/102 |

FOREIGN PATENT DOCUMENTS

| | | |
|---|---|---|
| JP | H09285876 A | 11/1997 |
| JP | H1110476 A | 1/1999 |
| JP | 2002187040 A | 7/2002 |
| JP | 2002336976 A | 11/2002 |
| JP | 2008126301 A | 6/2008 |
| JP | 2014161941 A | 9/2014 |
| WO | 2005095041 A1 | 10/2005 |

OTHER PUBLICATIONS

May 23, 2022, Office Action issued by the China National Intellectual Property Administration in the corresponding Chinese Patent Application No. 202080007985.4.

Jun. 28, 2022, Notification of Reasons for Refusal issued by the Japan Patent Office in the corresponding Japanese Patent Application No. 2019-007308.

Mar. 31, 2020, International Search Report issued in the International Patent Application No. PCT/JP2020/001339.

Jan. 7, 2023, Office Action issued by the Taiwan Intellectual Property Office in the corresponding Taiwanese Patent Application No. 109101728.

* cited by examiner

Spindle angle detecting position

MACHINE TOOL

TECHNICAL FIELD

This disclosure relates to a machine tool capable of joining two workpieces to form a single workpiece.

BACKGROUND

Conventionally, there is known a machine tool having mutually opposite two spindles, such as a lath, wherein an axial end portion of a workpiece gripped by a gripping portion of one of the spindles and an axial end portion of another workpiece gripped by a gripping portion of the other spindle are joined to each other by a joining means, such as friction welding, welding, press-fitting or the like, to transform these workpieces are into a single joined workpiece (refer, for example, to JPH 06-312278 A1 (PTL 1)).

CITATION LIST

Patent Literature

PTL 1: JPH 06-312278 A1

In the above-mentioned conventional machine tool, in order to accurately join the two workpieces so as to be coaxial with each other, before the joining, the axial end faces of both workpieces are typically processed into a shape suitable for joining, by means of a tool such as a cutting tool. However, due to various factors, such as wear or tear of the tools, deterioration of the cutting oil supplied to the machining part, aging deterioration of the machine tools, etc., misalignment (eccentricity) may occur unexpectedly, between the two joined workpieces.

SUMMARY

Technical Problem

However, even when misalignment occurs between the two joined workpieces, the conventional machine tool is unable to detect such misalignment.

The present disclosure has been accomplished in view of the above problems, and it is an object of the present disclosure to provide a machine tool that is capable of easily detecting misalignment between that two workpieces.

Solution to Problem

According to one aspect of the present disclosure, there is provided a machine tool comprising: a first spindle for gripping a first workpiece; a second spindle for griping a second workpiece; and a joining means for joining the axial end of each workpiece gripped by each spindle to form a joined workpiece from the first workpiece and the second workpiece, characterized in that the machine tool further comprises: an electric servomotor for moving the first spindle in a direction intersecting the axis of the first spindle; a current value detecting means for detecting a current value of the electric servomotor; and a misalignment detecting means for detecting misalignment between the first workpiece and the second workpiece of the joined workpiece, based on the current value detected by the current value detecting means when the joined workpiece is gripped by both spindles and rotated by the first spindle or the second spindle.

Preferably, in the machine tool of the present disclosure with the configuration as described above, the misalignment detecting means detects the misalignment between the first workpiece and the second workpiece in the joined workpiece, when the amplitude of the current value detected by the current value detecting means reaches or exceeds a predetermined value.

Preferably, the machine tool of the present disclosure with the configuration as described above further comprises a rotation angle detecting means for detecting a rotation angle of the first spindle with reference to a predetermined rotation position, and the misalignment detecting means is configured to detect the direction of misalignment of the second workpiece with respect to the first workpiece, based on the rotation angle detected by the rotation angle detecting means and the fluctuation cycle of the current value detected by the current value detecting means.

Preferably, in the machine tool of the present disclosure with the configuration as described above, the joining means is configured to carry out friction-welding of the axial end of the first workpiece gripped by the first spindle and the axial end of the second workpiece gripped by the second spindle.

Advantageous Effect

According to the present disclosure, it is possible to provide a machine tool capable of easily detecting misalignment between two joined workpieces.

DETAILED DESCRIPTION

The machine tool 1 according to one embodiment of the present disclosure will be described below in detail with reference to the drawings.

Figure 1:
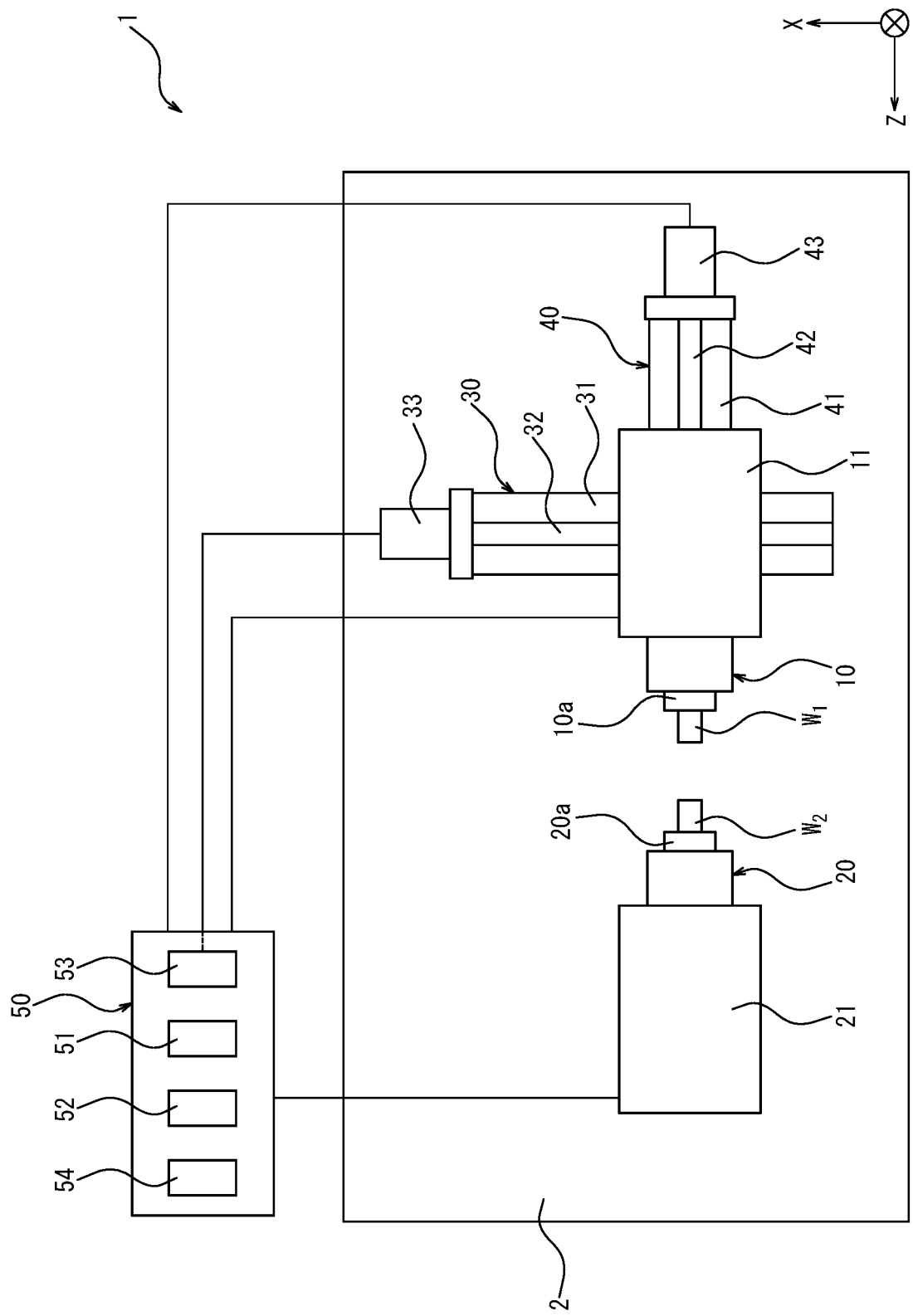
FIG. 1 is an explanatory view schematically illustrating the structure of the machine tool according to one embodiment of the present disclosure.

The machine tool 1 illustrated in FIG. 1 is configured as a lathe, such as a CNC lathe, and includes a first spindle 10 and a second spindle 20 mounted on a base 2.

The first spindle 10 and the second spindle 20 are arranged so that the axis of the first spindle 10 and the axis of the second spindle 20 are parallel to each other and separated from each other in the axial direction. Hereinafter, the direction parallel to the axes of the first spindle 10 and the second spindle 20 is defined as the Z-axis direction, the direction orthogonal to the Z-axis direction is defined as the X-axis direction, and the directions orthogonal to the Z-axis direction and the X-axis direction is defined as the Y-axis direction.

The first spindle 10 is rotatably supported by the first headstock 11 and is adopted to be rotationally driven by a first spindle motor. As the first spindle motor, for example, there may be used a built-in motor configured between the first spindle 11 and the first spindle 10 inside the first spindle 11. A first chuck 10a is provided at the tip of the first spindle 10 so that the first spindle 10 is adopted to grip the first workpiece W1 by the first chuck 10a. The first workpiece W1 may be rotated by rotationally driving the first spindle 10 by means of the first spindle motor while gripping the first workpiece W1 by means of the first chuck 10a.

The second spindle 20 is rotatably supported by the second spindle 21 and adopted to be rotationally driven by a second spindle motor. As the second spindle motor, for example, there may be used a built-in motor configured between the second spindle 21 and the second spindle 20 inside the second spindle 21.

A second chuck 20a is provided at the tip of the second spindle 20 facing the first spindle 10. The second spindle 20 is adopted to grip the second workpiece W2 by the second chuck 20a. The second workpiece W2 may be rotated by rotationally driving the second spindle 20 by means of the second spindle motor while gripping the second workpiece W2 by means of the second chuck 20a.

Between the base 2 and the first headstock 11, there is provided an X-axis moving mechanism 30 for moving the first spindle 10 in the X-axis direction, and a Z-axis moving mechanism 40 for moving the first spindle 10 in the Z-axis direction.

The X-axis moving mechanism 30 includes an X-axis guide rail 31 fixed to the base 2 and extending along the X-axis direction, and the Z-axis moving mechanism 40 is slidably mounted on the X-axis guide rail 31. A ball/screw mechanism 32 is provided between the X-axis guide rail 31 and the Z-axis moving mechanism 40. An electric servomotor 33 is connected to the ball screw mechanism 32. By rotationally driving the ball screw mechanism 32 by means of the electric servomotor 33, the first spindle 10 may be moved together with the Z-axis moving mechanism 40 in the X-axis direction along the X-axis guide rail 31. Furthermore, the electric servomotor 33 can also be operated so as to hold the position of the first spindle 10 in the X-axis direction.

As the electric servomotor 33 for moving the first spindle 10 in the X-axis direction orthogonal to the axis of the first spindle 10, various configurations may be adopted, such as an AC servomotor, a DC servomotor, etc. capable of moving the first spindle 10 in the X-axis direction while holding the first spindle 10 at a desired position in in the X-axis direction.

The Z-axis moving mechanism 40 includes a Z-axis guide rail 41 that extends along the Z-axis direction. The first headstock 11 is slidably mounted on the Z-axis guide rail 41. A ball/screw mechanism 42 is provided between the Z-axis guide rail 41 and the first headstock 11. An electric servomotor 43 is connected to the ball/screw mechanism 42. By rotationally driving the ball screw mechanism 42 by means of the electric servomotor 43, the first spindle 10 may be moved together with the first spindle stock 11 in the Z-axis direction along the Z-axis guide rail 41.

As the electric servomotor 43 for moving the first spindle 10 in the Z-axis direction, various configurations may be adopted, such as an AC servomotor, a DC servomotor, etc., capable of moving the first spindle 10 in the Z-axis direction while holding the first spindle 10 is moved as a desired position in the Z-axis direction can be adopted.

The machine tool 1 may be configured to include a cutting tool. In this case, the configuration may be such that the first workpiece W1 gripped by the first chuck 10a of the first spindle 10 and the second workpiece W2 gripped by the second chuck 20a of the second spindle 20 can be machined by the cutting tool.

The machine tool 1 includes a control unit 50. The control unit 50 has a function as a microcomputer provided with a CPU (central processing unit) and a storage means, such as a memory, and is connected to the spindle motor of the first spindle 10, the spindle motor of the second spindle 20, the electric servomotor 33 and the electric servomotor 43.

The control unit 50 integratedly controls the operation of the spindle motor of the first spindle 10, the spindle motor of the second spindle 20, the electric servomotor 33, the electric servomotor 43 and the tool, so that the tool is operated to process first workpiece W1 gripped by the first chuck 10a of the first spindle 10 or the second workpiece W2 gripped by the second chuck 20a of the second spindle 20.

Furthermore, the control unit 50 integrally controls the operation of the spindle motor of the first spindle 10, the spindle motor of the second spindle 20, the electric servomotor 33 and the electric servomotor 43, so that the axial end of the first workpiece W1 gripped by of the first chuck 10a of the first spindle 10. and the axial end of the second workpiece W2 gripped by the second chuck 20a of the second spindle 20 can be friction-welded to form one joined workpiece W3. That is, the control unit 50 has a function as a joining means 51 for friction welding the axial end of the first workpiece W1 gripped by the first chuck 10a of the first spindle 10 and the axial direction of the second workpiece W2 gripped by the second chuck 20a of the second spindle 20 to form a single joined workpiece W3.

Hereinafter, explanation will be made of the procedure or method in which, by means of the function of the control unit 50 as the joining means 51, the machine tool 1 friction-welds the axial end portion of the first workpiece W1 and the axial end portion of the second workpiece W2.

First, as illustrated in FIG. 1, the first spindle 10 is made to grip the first workpiece W1 by means of the first chuck 10a, and the second spindle 20 is made to grip the second workpiece W2 by means of the second chuck 20a. The first spindle 10 and the second spindle 20 are arranged coaxially so that the axial end of the first workpiece W1 and the axial end of the second workpiece W2 are opposed to each other.

As the first workpiece W1 and the second workpiece W2, for example, a round bar made of a steel material may be used, though one made of another metal material or having another shape may also be used. Before the first workpiece W1 and the second workpiece W2 are friction-welded, it is preferred that the first workpiece W1 and the second workpiece W2 are processed into a shape suitable for friction welding by using, for example, the above-mentioned tool.

Next, the second spindle 20 is rotated at a predetermined rotation speed while the rotation of the first spindle 10 is stopped, so that the first workpiece W1 gripped by the first spindle 10 and the second workpiece W2 gripped by the second spindle 20 are rotated relative to each other by a predetermined rotation speed difference.

In the present embodiment, the first workpiece W1 and the second workpiece W2 are rotated relatively to each other, by rotating only the second spindle 20 at a predetermined rotation speed while stopping the rotation of the first spindle 10. However, the first workpiece W1 and the second workpiece W2 may be rotated relatively to each other, by rotating only the first spindle 10 at a predetermined rotation speed while stopping the rotation of the second spindle 20. Alternatively, the first workpiece W1 and the second workpiece W2 may be rotated relatively to each other, by rotating the first spindle 10 and the second spindle 20 in the same direction at different rotation speeds. Further alternatively, the first workpiece W1 and the second workpiece W2 may be rotated relatively to each other, by rotating them in opposite directions at different rotation speeds or the same rotation speed.

Figure 2:
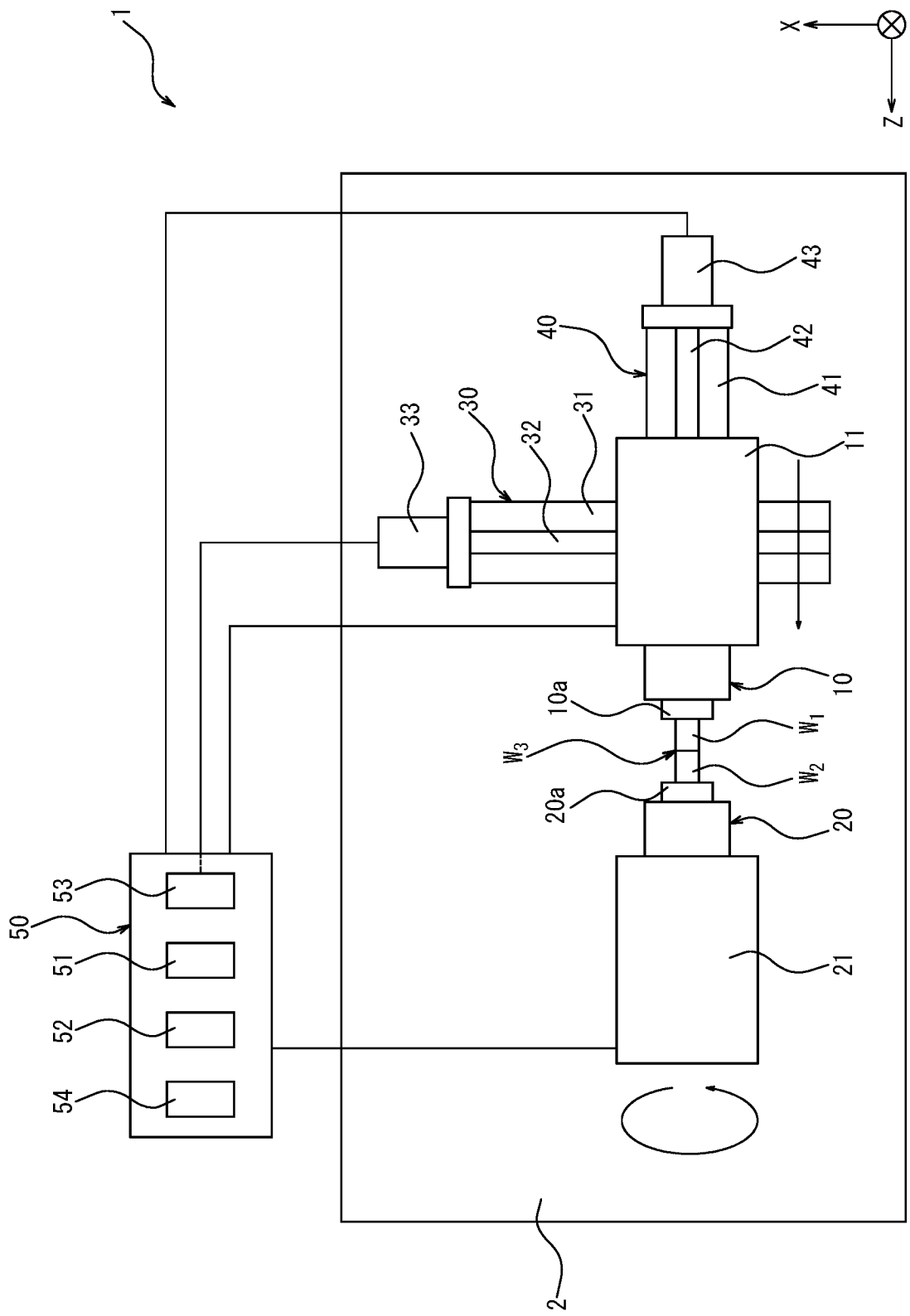
FIG. 2 is an explanatory view illustrating the state where two workpieces are friction-welded by the machine tool of FIG. 1.

Next, as illustrated in FIG. 2, in a state where the first workpiece W1 gripped by the first spindle 10 and the second workpiece W2 gripped by the second spindle 20 are relatively rotated with each other by a predetermined rotation speed difference, the electric servomotor 43 of the Z-axis moving mechanism 40 is operated to move the first spindle 10 in the Z-axis direction so as to approach the second spindle 20, so that the axial end portion (axial end face) of the first workpiece W1 is brought into contact with the axial end portion (axial end face) of the second workpiece W2. When the axial end portion of the first workpiece W1 comes into contact with the axial end of the second workpiece W2, due to the predetermined rotation speed difference between the first workpiece W1 and the second workpiece W2, friction heat is generated between the axial end portion the first workpiece W1 and the axial end portion of the second workpiece W2, so that the first workpiece W1 and the second workpiece W2 are frictionally heated.

The rotation speed difference between the first workpiece W1 and the second workpiece W2 that rotate relative to each other may be a rotation speed difference that can generate frictional heat required for friction-welding the first workpiece W1 and the second workpiece W2.

When the axial end portion of the first workpiece W1 and the axial end portion of the second workpiece W2 reach a predetermined temperature due to the frictional heating, the rotation of the second spindle 20 is stopped for stopping the relative rotation between the first workpiece W1 and the second workpiece W2 and the first spindle 10 is then further moved in the Z-axis direction so as to approach the second spindle 20. As a result, the axial end portion of the second workpiece W2 is pressed against the axial end portion of the first workpiece W1 at a predetermined pressure (upset pressure) in the direction along the Z-axis direction, so that the first workpiece W1 and the second workpiece W2 are friction-welded to form one joined workpiece W3, with their axial end portions as joint surfaces.

The procedure of the friction-welding by means of the joining means 51 is not limited to what has been described above, and may be variously changed as long as the first workpiece W1 and the second workpiece W2 can be joined by friction-welding.

The machine tool 1 includes misalignment detecting means 52 for detecting the misalignment when misalignment (eccentricity) occurs between the axes of the first workpiece W1 and the second workpiece W2 of the joined workpiece W3, which has been formed by joining the first workpiece W1 and the second workpiece W2 by means of the function as the joining means 51. The misalignment detecting means 52 is configured as a function of the control unit 50. That is, the control unit 50 is configured to function as the misalignment detecting means 52 for detecting misalignment between the first workpiece W1 and the second workpiece W2 in the joined workpiece W3 formed by joining the first workpiece W1 and the second workpiece W2 by the joining means 51.

Furthermore, the control unit 50 is provided with an ammeter 53 as a current value detecting means. The ammeter 51 is connected to the electric servomotor 33 and is adopted to detect the current value of the current (i.e., the current value of the electric servomotor 33) supplied from the control unit 50 to the electric servomotor 33.

Figure 3:
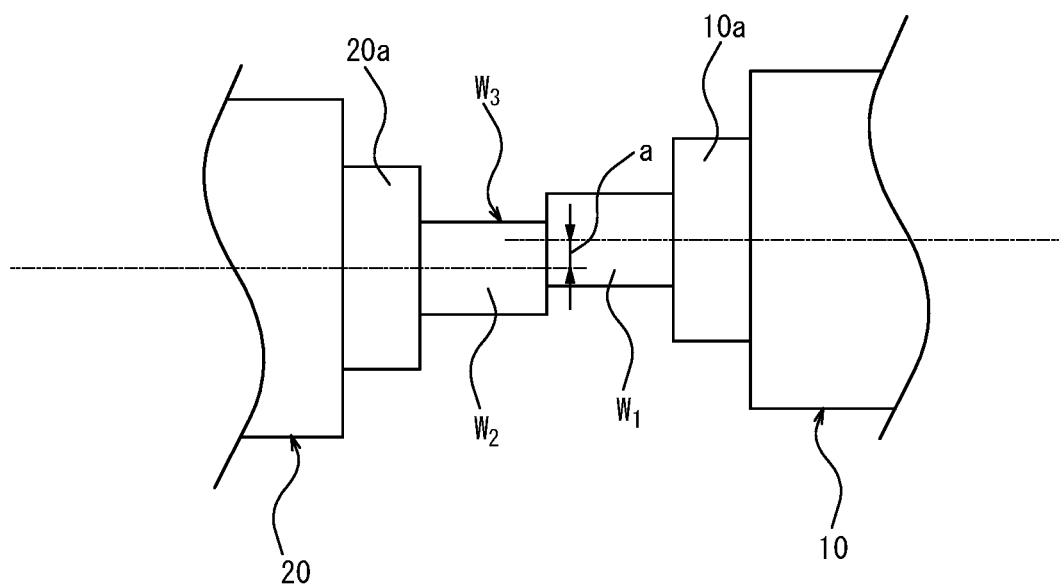
FIG. 3 is an explanatory view illustrating the state of occurrence of misalignment between the two workpieces joined by friction welding.
Figure 3:
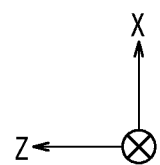

As illustrated in FIG. 3, in the joined workpiece W3 formed by joining the first workpiece W1 and the second workpiece W2 by means of the machine tool 1, there may be caused unexpected misalignment between the joined first workpiece W1 and the second workpiece W2 due to various factors, such as wear or loss of the tool, deterioration of the cutting oil supplied to the machine tool and aged deterioration of the machine tool 1 itself. The machine tool 1 according to the present embodiment is capable of detect such misalignment by means of the misalignment detecting means 52.

Hereinafter, explanation will be made of the procedure or method for detecting the misalignment between the first workpiece W1 and the second workpiece W2 in the joined workpiece W3, by means of the misalignment detecting means 52.

Figure 4:
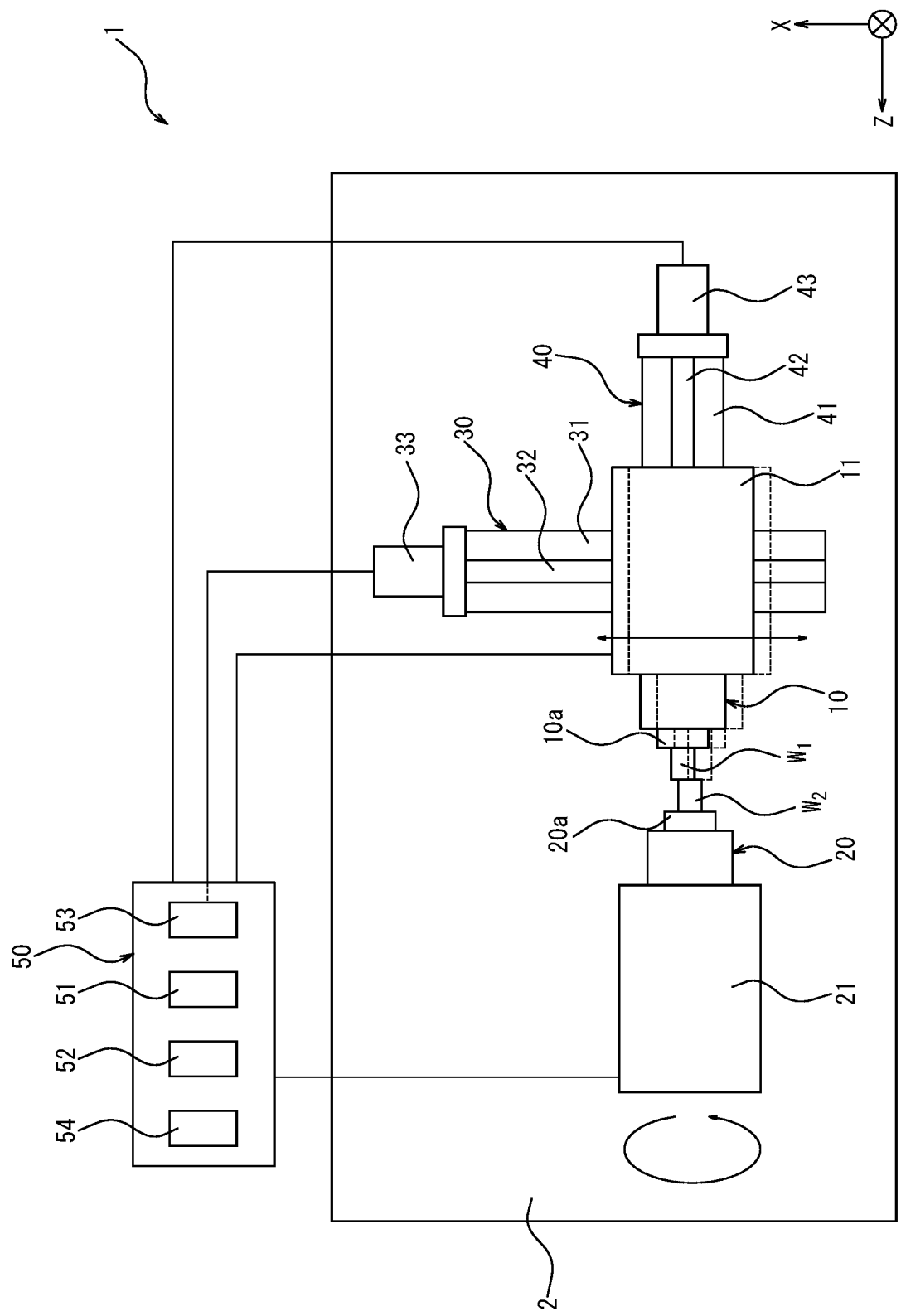
FIG. 4 is an explanatory view illustrating the state where the misalignment of the joined workpiece is detected by the machine tool of FIG. 1.

First, as illustrated in FIG. 4, in a state where the first workpiece W1 and the second workpiece W2 have been joined by the joining means 51 of the machine tool 1 to form the joined workpiece W3, which is then gripped by the first chuck 10a and the second chuck 20a, only the second spindle 20 is operated to rotate the joined workpiece W3. On this occasion, the position of the first spindle 10 in the X-axis direction is held by the electric servomotor 33 that is controlled by the control unit 50. When the second spindle 20 operates and the joined workpiece W3 rotates, the rotation of the second spindle 20 is transmitted to the first spindle 10 via the joined workpiece W3, and the first spindle 10 is also driven by the second spindle 20 to rotate.

It is to be noted that the joined workpiece W3 may be rotated by operating the first spindle 10, instead of the second spindle 20.

When the joined workpiece W3, with the first workpiece W1 and the second workpiece W2 misaligned relative to each other, is gripped by the first chuck 10a and the second chuck 20a and rotated, as illustrated in FIG. 4, vibration occurs in the X-axis direction on the first spindle 10, about the axis of the second spindle 20, which is fixed to the table 2 and cannot move in the X-axis direction, and with an amplitude that is twice the amount of misalignment (eccentricity) between the first workpiece W1 and the second workpiece W2. This vibration is applied to the electric servomotor 33 via the ball/screw mechanism 32, so that the electric servomotor 33 is applied with a load corresponding to the misalignment between the first workpiece W1 and the second workpiece W2 on the first spindle 10, at a predetermined cycle according to the rotation angle of the first spindle 10.

Figure 5:
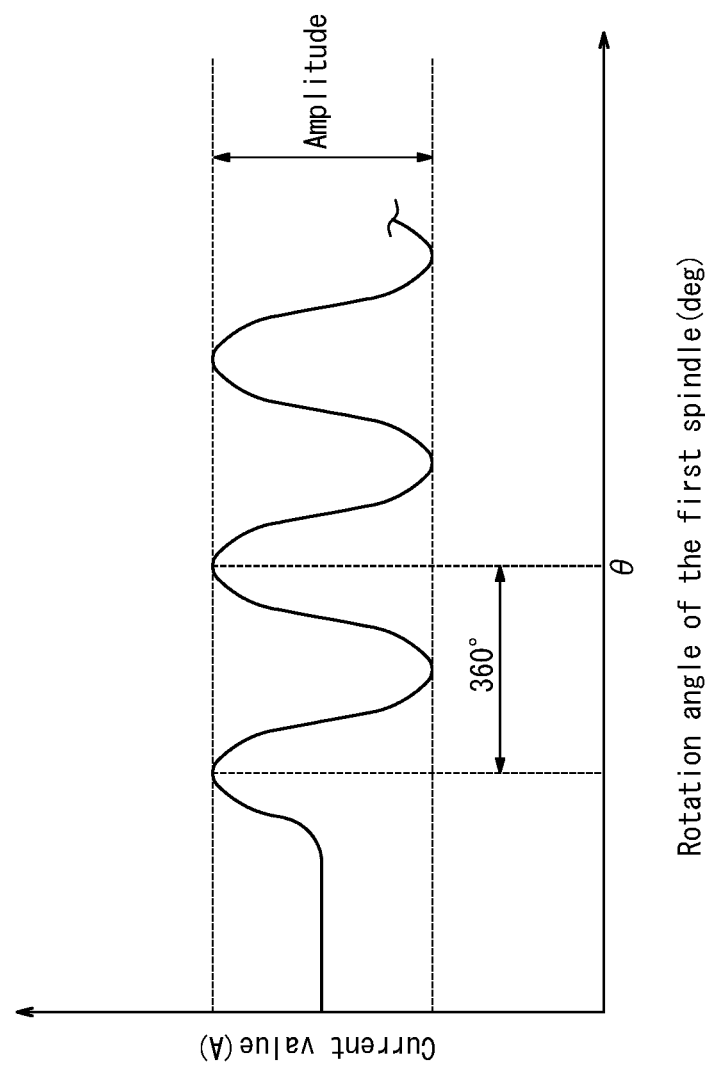
FIG. 5 is a diagram illustrating an example of fluctuation of the current value detected by the current value detecting means at the time of detecting a misalignment of the joined workpiece.

In this instance since the electric servomotor 33 of the X-axis moving mechanism 30 is controlled by the control unit 50 to hold the position of the first spindle 10 in the X-axis direction, a reaction force acting against the load is generated on the first spindle 10 to hold the position of the first spindle 10 in the X-axis direction. Thus, the current value of the electric current supplied from the control unit 50 to the electric servomotor 33 increases or decreases according to the rotation angle of the first spindle 10. That is, the current value of the electric servomotor 33 increases or decreases according to the rotation angle of the first spindle 10, for example, as illustrated in FIG. 5. The range of such increase/decrease, i.e., the fluctuation range, of the current value of the electric servomotor 33 increases as the amount of misalignment (eccentricity) between the first workpiece W1 and the second workpiece W2 increases.

The correlation between the amount of misalignment (eccentricity) of the first workpiece W1 and the second workpiece W2 and the fluctuation range of the current value of the electric servomotor 33 differs depending on the structure of the machine tool 1, the structure of the control unit 50, and the like. Therefore, the storage means of the control unit 50 stores the correlation between the eccentricity and the amplitude of the current value obtained in advance by experiments or the like. For example, as illustrated in FIG. 6, the correlation may be stored as a function describing the correlation between the eccentricity and the amplitude of the current value, or the correlation between the eccentricity and the amplitude of the current value may be stored by another method, such as a numerical table indicating a plurality of numerical values.

Since the current value of the electric servomotor 33 is detected by the ammeter 53, the misalignment detecting means 52 is capable of detecting the misalignment between the first workpiece W1 and the second workpiece W2 of the joined workpiece W3, based on the fluctuation range of the current value detected by the ammeter 53. In the present embodiment, the misalignment detecting means 52 is configured to detect the misalignment between the first workpiece W1 and the second workpiece W2 of the joined workpiece W3, based on the amplitude of the current value (i.e., the difference between the maximum value and the minimum value of the fluctuating current value) detected by the ammeter 53.

Figure 6:
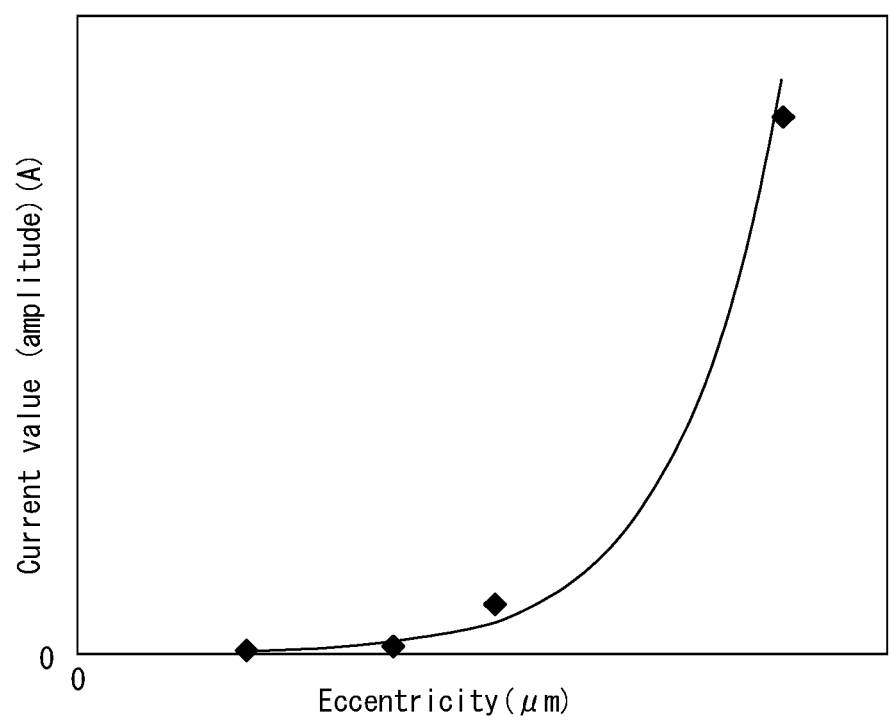
FIG. 6 is a diagram illustrating the correlation between the amplitude of the current value of an electric servomotor and the eccentricity of the misalignment.

More specifically, the misalignment detecting means 52 is adopted to detect the mount of misalignment between the first workpiece W1 and the second workpiece W2 in the joined workpiece W3, by applying the amplitude of the current value obtained from the fluctuation of the current value detected by the ammeter 53, as illustrated in FIG. 5, to the correlation as illustrated in FIG. 6. Then, when the amplitude of the current value obtained from the current value detected by the ammeter 53 reaches or exceeds a predetermined value, i.e., a predetermined threshold value, the misalignment detecting means 52 determines that there is misalignment between the workpiece W1 and the second workpiece W2 of the joined workpiece W3 and detects the misalignment.

The threshold value for determining the presence or absence of misalignment can be arbitrarily set in consideration, for example, of the dimensional tolerance required for a product manufactured by further processing the joined workpiece W3. Furthermore, the threshold value is set in advance and input to a program or the like stored in the storage means of the control unit 50 in advance.

It is to be noted that the misalignment detecting means 52 may be configured to determine the occurrence of misalignment between the workpiece W1 and the second workpiece W2 of the joined workpiece W3 and to detect the misalignment when the amplitude of the current value obtained from the fluctuation of the current value detected by the ammeter 53 reaches or exceeds a preset predetermined value, i.e., the predetermined threshold value, without using the correlation between the eccentricity amount and the amplitude of the current value.

Furthermore, the misalignment detecting means 52 may also be configured to determine the occurrence of misalignment between the workpiece W1 and the second workpiece W2 of the joined workpiece W3 and to detect the misalignment when, within the fluctuation range of the current value detected by the ammeter 53, the absolute value of the increase/decrease amount relative to the center value of the fluctuation of the current value, instead of the amplitude of the current value, reaches or exceeds the predetermined threshold value.

When the misalignment detecting means 52 detects that there is misalignment between the first workpiece W1 and the second workpiece W2 with an amount reaching or exceeding the predetermined misalignment amount (eccentricity), the machine tool 1 makes an error determination for the joined workpiece W3. The machine tool 1 upon an error determination may be configured to notify an operator, etc., of such an error. The error notification may be made in various manners, for example, by automatically stopping the operation of the machine tool 1, issuing an alarm, turning on the warning light, and displaying an error on a monitor or the like.

In this way, according to the machine tool 1 of the present embodiment, the joined workpiece W3 gripped by the first chuck 10a and the second chuck 20a is rotated by the first spindle 10 or the second spindle 20. On this occasion, misalignment between the first workpiece W1 and the second workpiece W2 in the joined workpiece W3 can be easily detected based on the fluctuation range of the current value detected by the ammeter 53.

Furthermore, based on the correlation between the eccentricity amount and the amplitude of the current value obtained in advance, the misalignment amount between the first workpiece W1 and the second workpiece W2 in the joined workpiece W3 can be easily detected.

Furthermore, according to the machine tool 1 of the present embodiment, the misalignment between the first workpiece W1 and the second workpiece W2 in the joined workpiece W3 is detected based on the fluctuation range of the current value of the electric servomotor 33, which fluctuates depending upon the misalignment amount. Thus, the amount of misalignment can be detected regardless of the mass and shape of the first workpiece W1, the second workpiece W2, or the joined workpiece W3. Therefore, it is possible to improve the versatility of the machine tool 1 by eliminating the need to use a misalignment detecting means 52 with a setting or configuration corresponding to each of a plurality of types of workpieces having different masses, shapes, and the like.

The machine tool 1 may further include a rotation angle detecting means 54 for detecting the rotation angle of the first spindle 10 with respect to a predetermined rotation position, and may be configured so that the misalignment detecting means 52 detects the direction of misalignment of the second workpiece W2 with respect to the first workpiece W1, based on the rotation angle detected by the rotation angle detecting means 54, and the fluctuation cycle of the current value detected by the ammeter 53.

In this case, as the rotation angle detecting means 54, there may be used a rotary encoder or the like.

Figure 7:
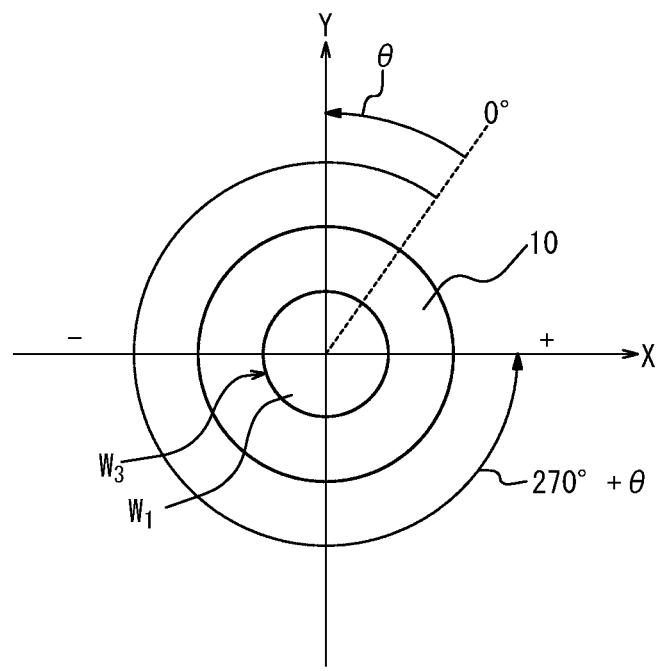
FIG. 7 is an explanatory view illustrating the method for detecting the direction of the misalignment.

In the misalignment detecting means 52, for example, when the misalignment of the first workpiece W1 with respect to the second workpiece W2 occurs in the positive direction of the X axis, the current value increases in the positive direction so that, as illustrated in FIG. 7, the rotation angle detecting means 54 detects the rotation angle of the first spindle 10 with reference to the upper spindle angle detection position along the Y-axis of the first spindle 10. In this instance, if the current value reaches the maximum value when the rotation angle of the first spindle 10 is θ (see FIG. 5), it can be detected that the misalignment is in the direction of 270°+θ in terms of the rotation angle of the first spindle 10.

As described above, in the machine tool 1 of the present embodiment, even upon occurrence of misalignment between the first workpiece W1 and the second workpiece W2 not only in the X-axis direction but also in any direction. it is possible to detect such misalignment. However, by adopting the configuration including the rotation angle detecting means 54, it is possible also to easily detect the direction of the misalignment between the first workpiece W1 and the second workpiece W2 in the joined workpiece W3.

Furthermore, since the machine tool 1 of the present embodiment is adopted, as described above, to detect the misalignment amount and the misalignment direction of the misalignment between the first workpiece W1 and the second workpiece W2 in the joined workpiece W3. it is possible easily to prevent misalignment by adjusting the machine tool 1 based on such detection results.

It goes without saying that the present disclosure is not limited to the above-described embodiment, and various modifications may be made without departing from the spirit of the present disclosure.

For example, in the above-described embodiment, it is determined that there is misalignment between the first workpiece W1 and the second workpiece W2 in the joined workpiece W3, when the amplitude of the current value of the electric servomotor 33 detected by the ammeter 53 reaches or exceeds a predetermined value. However, occurrence of misalignment between the first workpiece W1 and the second workpiece W2 in the joined workpiece W3 may be determined based on other parameters derived from the current value of the electric servomotor 33 detected by the ammeter 53.

Furthermore, in the above-described embodiment, upon determination of the misalignment, the first spindle 10 is moved by the electric servomotor 33 in the direction perpendicular to the axis of the first spindle 10. However, the moving direction may be changed in various manner as long as the direction intersects the axis of the first spindle 10.

For example, in the above-mentioned embodiment, it is determined that there is misalignment between the first workpiece W1 and the second workpiece W2 in the joined workpiece W3, when the amplitude of the current value of the electric servomotor 33 detected by the ammeter 53 reaches or exceeds a predetermined value. However, it is also possible to carry out processing of the fluctuation in the current value of the electric servomotor 33 detected by the ammeter 53 by means of FFT (Fast Fourier Transform) and determine that there is misalignment between the first workpiece W1 and the second workpiece W2 in the joined workpiece W3, when a peak waveform appears in the frequency component based on the rotation speed of the first spindle 10. Furthermore, it is also possible to use means based on the frequency upon of rotation of the first spindle 10, such as a bandpass filter, for extracting only the frequency component from the fluctuation in the current value of the electric servomotor 33 detected by the ammeter 53, and to determine that there is misalignment between the first workpiece W1 and the second workpiece W2 in the joined workpiece W3 based on the extracted components. According to these methods, even when the fluctuation range of the current value of the electric servomotor 33 detected by the ammeter 53 is minute, it is possible to accurately determine the occurrence of misalignment between the first workpiece W1 and the second workpiece W2 in the joined workpiece W3.

Furthermore, in the above-described embodiment, the joining means 51 is configured to weld the axial end portion of the first workpiece W1 and the axial end portion of the second workpiece W2 by friction welding. However, the present disclosure is not limited to this, and the joining method may be variously changed. For example, the axial end of the first workpiece W1 and the axial end of the second workpiece W2 may be joined by welding means, such as laser welding. Alternatively, the axial end of the first workpiece W1 and the axial end portion of the second workpiece W2 may be joined by pressing and fitting unevenness provided therein.

Furthermore, in the above-described embodiment, the first spindle 10 is configured to be movable in the Z-axis direction by the Z-axis moving mechanism 40. However, so long as an X-axis moving mechanism 30 is provided for moving the first spindle 10 in the X-axis direction, the Z-axis moving mechanism 40 may be arranged on the side of the second spindle 20, or the Z-axis moving mechanism 40 may not be provided.

Furthermore, the machine tool 1 may include an annular guide bush between the first spindle 10 and the second spindle 20, for supporting the second workpiece W2 gripped by the second chuck 20a of the second spindle 20. In this case, the threshold value for determining the presence or absence of misalignment is preferably set so that the amount of misalignment generated between the first workpiece W1 and the second workpiece W2 in the joined workpiece W3 is within the range in which the joined workpiece W3 can pass through the guide bush. By this, when the joined workpiece W3 after the joining is pulled into the second spindle 20, it is possible to prevent the stepped portion from being caught in the guide bush due to the misalignment of the joined workpiece W3, and thereby requiring disassembly and repair of the guide bush.

REFERENCE SIGNS LIST

1 Machine tool
2 Base
10 First spindle
10a First chuck
11 First headstock
20 Second spindle
20a Second chuck
21 Second headstock
30 X-axis moving mechanism
31 X-axis guide rail
32 Ball/screw mechanism
33 Electric servomotor
40 Z-axis moving mechanism
41 Z-axis guide rail
42 Ball/screw mechanism
43 Electric servomotor
50 Control unit
51 Joining means
52 Misalignment detecting means
53 Ammeter (current value detecting means)
54 Rotation angle detecting means
W1 First workpiece
W2 Second workpiece
W3 Joined workpiece
a Eccentricity

The invention claimed is:

1. A machine tool comprising:
   a first spindle for gripping a first workpiece;
   a second spindle for gripping a second workpiece; and
   a joining means for joining the axial end of each workpiece gripped by each spindle to form a joined workpiece from the first workpiece and the second workpiece, characterized in that the machine tool further comprises:
   an electric servomotor for moving the first spindle in a direction intersecting the axis of the first spindle;
   a current value detecting means for detecting a current value of the electric servomotor;
   a misalignment detecting means for detecting misalignment between the first workpiece and the second workpiece of the joined workpiece, based on the current value detected by the current value detecting means when the joined workpiece is gripped by both spindles and rotated by the first spindle or the second spindle; and
   a rotation angle detecting means for detecting a rotation angle of the first spindle with reference to a predetermined rotation position, and wherein
   the misalignment detecting means is configured to detect the direction of misalignment of the second workpiece with respect to the first workpiece, based on the rotation angle detected by the rotation angle detecting means and the fluctuation cycle of the current value detected by the current value detecting means.

2. The machine tool according to claim 1, wherein the misalignment detecting means detects the misalignment between the first workpiece and the second workpiece in the joined workpiece, when the amplitude of the current value detected by the current value detecting means reaches or exceeds a predetermined value.

3. The machine tool according to claim 1, wherein the joining means is configured to carry out friction-welding of the axial end of the first workpiece gripped by the first spindle and the axial end of the second workpiece gripped by the second spindle.

4. The machine tool according to claim 2, wherein the joining means is configured to carry out friction-welding of the axial end of the first workpiece gripped by the first spindle and the axial end of the second workpiece gripped by the second spindle.

* * * * *